Sept. 19, 1950 J. DEDIEU 2,522,607
GUIDED MOTION TRANSMISSION
Filed March 18, 1947 2 Sheets-Sheet 1

INVENTOR
JEAN DEDIEU
BY
ATTY.

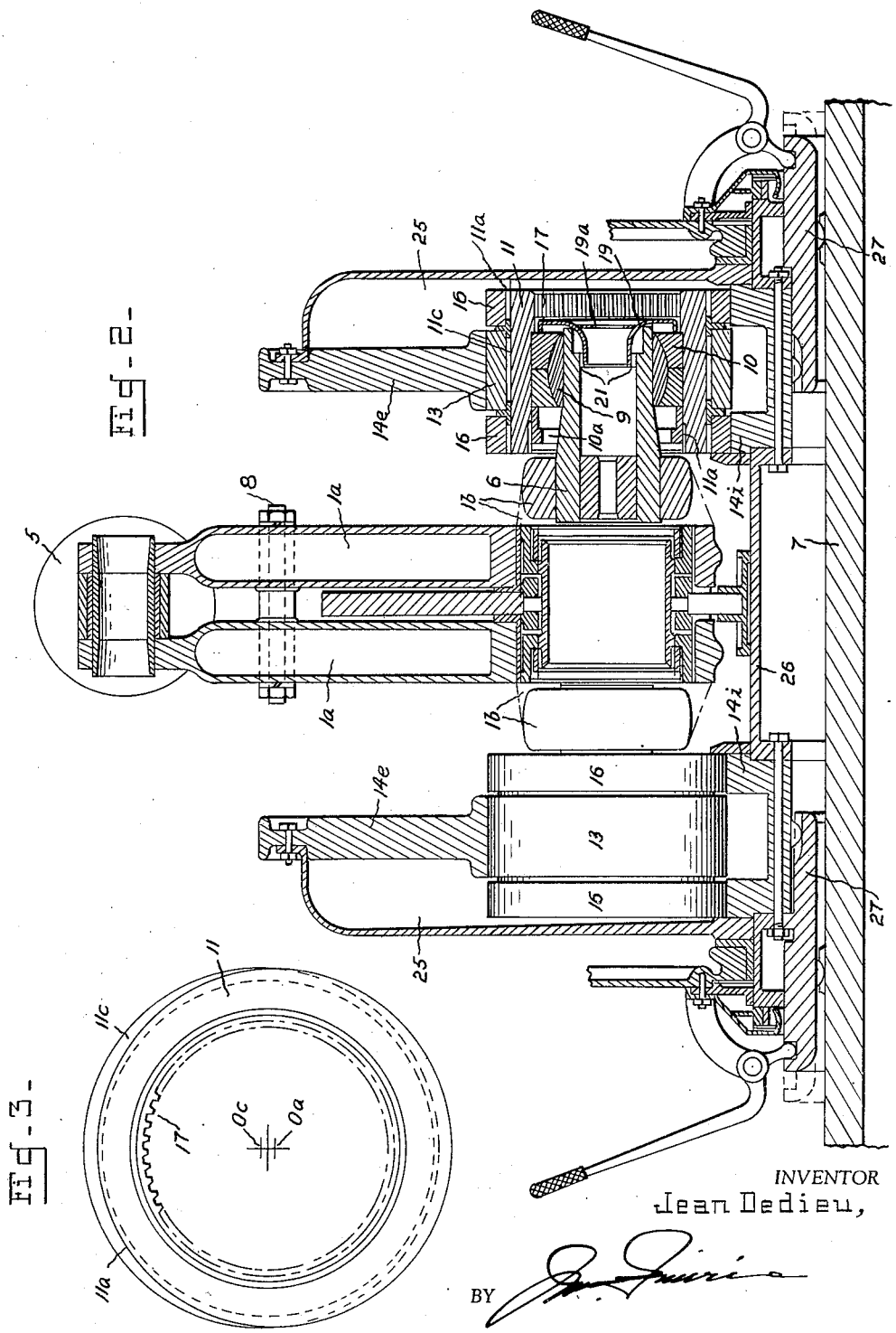

Patented Sept. 19, 1950

2,522,607

UNITED STATES PATENT OFFICE 2,522,607

GUIDED MOTION TRANSMISSION

Jean Dedieu, His, Haute-Garonne, France

Application March 18, 1947, Serial No. 735,379
In France March 29, 1946

4 Claims. (Cl. 74—54)

The present invention relates to improvements in guided motion lever and cam systems which may be applied in various machines and are found particularly in the engine described in applicant's French Patent No. 814,546, filed February 29, 1936. In this engine, a cam is formed with two rolling paths between which are engaged rollers mounted at the end of one arm of a L or V shaped lever fulcrumed on a fixed pin and the other arm of which is connected to two pistons and receives, during the expansion in the cylinder corresponding to one of said pistons, an action which is transmitted by the rollers to one of said paths of the cam, while the corresponding arm of another lever connected to another piston working in the same cylinder receives an action which is transmitted in the same direction to the other path of said cam, whereafter said levers are rocked in the opposite directions by the expansion in two other cylinders placed on either side of the first mentioned cylinder, and the rollers act respectively upon the cam paths opposite to those upon which they have acted in the preceding instance.

In this system, the same rollers had to cooperate successively with one and the other path of the cam and had therefore to execute transversal movements between said paths, which transversal movements, although of very small amplitude, caused prejudicial shocks.

The present invention has for its object an improved system of the above defined character which avoids the mentioned drawback and has other advantages which will appear from the following specification.

This improved system is essentially characterised by the fact that each lever carries a central roller cooperating with one of the cam paths, and two lateral rollers placed on either side of said central roller and cooperating with the other cam path, said rollers rotating on eccentric bearing surfaces, whereby the above mentioned drawback is avoided.

Advantageously, said central roller and said lateral rollers are applied against the respective cam paths with a pressure adapted to produce an impression which is sufficient to overcome the accelerations and decelerations of said rollers, so as to avoid skidding of the rollers on the cam paths.

In an embodiment of the invention, the rollers are mounted on a sleeve surrounding a pin which is fixedly secured to the lever, said sleeve being adapted to be rotated on said pin in order to produce the desired pressure of the rollers against the respective cam paths.

Advantageously, the sleeve on which the rollers are rotatably mounted, preferably by means of roller bearings, is mounted on said pin so as to be able, in operation, to move angularly about a transversal axis which is located in the middle plane of said central roller and perpendicular to the axis of the pin and to the plane passing through the points in which the rollers make contact with the cams, so that the resultant of the reactions transmitted by said central and lateral rollers passes constantly through the point of intersection of said transversal axis with the axis of the pin, whereby any wedging of the rollers is made impossible.

In an embodiment of the invention, the sleeve is mounted on the pin by means of a ball and socket bearing, and is locked during operation so as to be able to rotate only about the above defined transversal axis.

Means are advantageously provided for adjusting at any time the pressure with which the rollers are applied against the cam paths; said means may be combined with the means for locking said sleeve.

In an embodiment of the invention, said sleeve is formed with internal teeth adapted to be engaged by corresponding teeth formed on an adjusting and locking member which can be turned by means of a key and which can be displaced axially of said sleeve so as to engage teeth formed in said pin, in order to lock said sleeve.

The accompanying drawings show by way of example an embodiment of the improved system according to the invention, as applied to an engine of the kind described in the above mentioned French patent.

Fig. 2 shows in its central part a section along the line A—A in Fig. 1, while the right part is a section along the line B—B in Fig. 1, and the left part is also a section along the line B—B, wherein the rollers are not shown in section.

Fig. 3 is an end view, at a larger scale, of the sleeve formed with excentric bearing surfaces.

Figure 1:
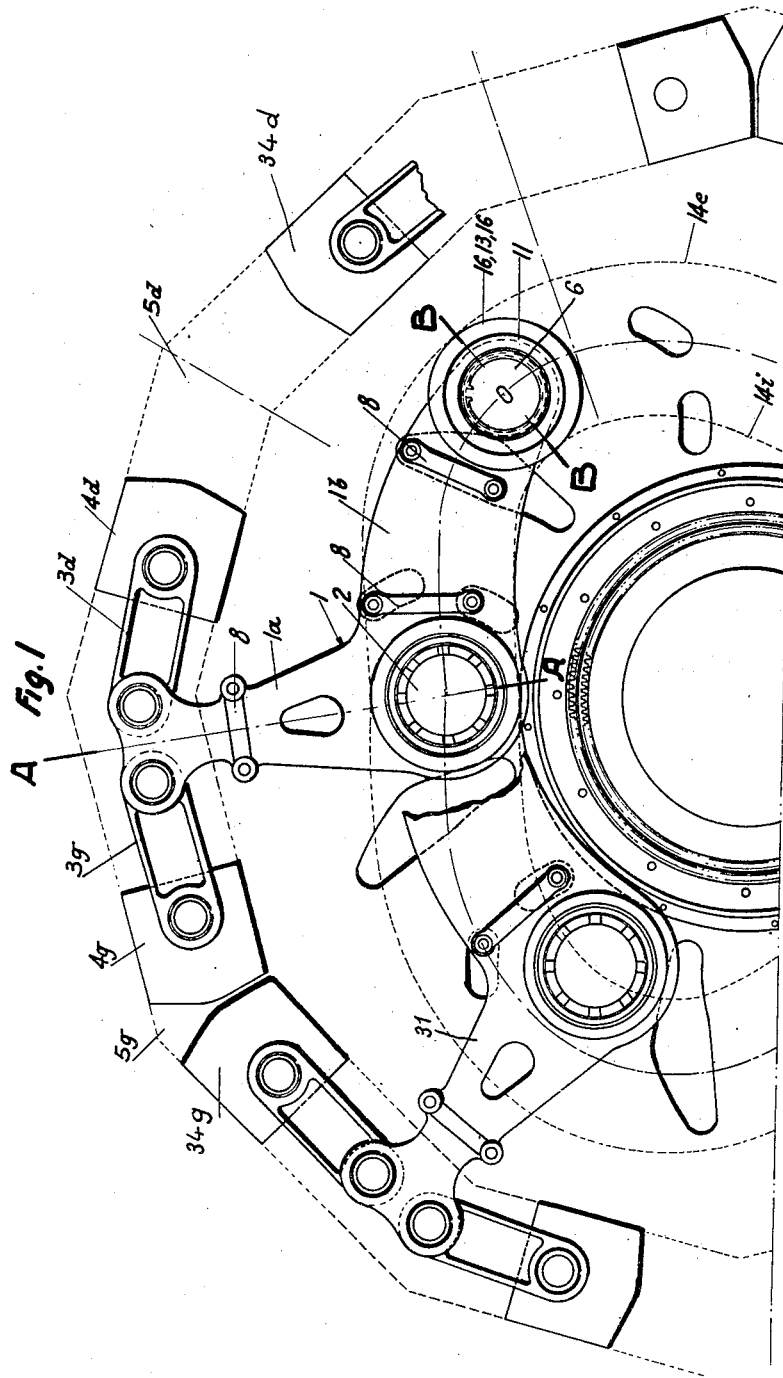
Fig. 1 is a schematical partial side view of the engine, showing particularly one of the levers and the outline of the cams.

On the drawings, 1 is an L-shaped lever forming part of the engine described in the above mentioned French patent. This lever is fulcrumed on a fixed pin 2, and one of its arms, 1a, is connected by links 3g and 3d to two pistons 4g and 4d working each in a cylinder 5g and 5d respectively, opposite to other pistons 34g and 34d which are similarly connected to similar arms of similar levers 31.

The other arm, 1b, of the lever 1 carries at its end a pin 6 on which the rollers are mounted.

In order to equilibrate the engine, each L-shaped lever is in practice constituted by two similar L-shaped levers mounted on either side of the plane passing through the center of the engine and perpendicular to the engine shaft 7, as shown on Fig. 2, the parallel arms of both levers being connected together by tie rods 8 (Figs. 1 and 2).

Both arms 1a are connected by a single link 3g to the piston 4g, and by a single link 3d to the piston 4d.

Each double L-shaped lever thus carries two pins 6 extending outwardly in opposite directions with respect to the middle plane of the engine.

On each pin 6 is shrunk a ball 9 surrounded by a socket 10 in two parts which are inserted into a sleeve 11 wherein they are secured by means of a nut 10a. The sleeve 11 is formed with a central bearing surface 11c having its center at Oc (Fig. 3), and with two lateral bearing surfaces 11a having their center at Oa, the points Oc and Oa being placed oppositely to one another with respect to the axis of the bore of the sleeve 11 coinciding with the axis of the pin 6.

On the bearing surface 11c is rotatably mounted, preferably by a roller bearing, a central roller 13 adapted to cooperate with the cam path of an external cam 14e, and on the bearing surfaces 11a are rotatably mounted, preferably also by roller bearings, two lateral rollers 16 adapted to cooperate with the cam paths of an inner cam 14i. The cam 14i receives the action of the rollers 16 when an explosion takes place in the cylinder 5g, while the cam 14e receives the action of the roller 13 when an explosion takes place in the cylinder 5d.

The sleeve 11 is formed internally with teeth 17 with which mesh constantly corresponding teeth formed on an adjusting and locking member 19 which can be turned by means of a key inserted into a polygonal opening 19a formed in said member, in order to adjust the pressure of application of the rollers 13 and 16 against the respective cam paths, while the engine is at rest. When this adjustment has been made, the member 19 is displaced axially to the interior, so that other teeth formed at its inner end come into engagement with other teeth 21 formed in the hollow pin 6. The teeth 17 and 21 may have the same pitch, or slightly different pitches.

It will be understood that, due to the member 19, the sleeve 11 will be locked against rotation on the ball 9 during the operation of the engine. However, said sleeve 11 will be able to execute on said ball 9 small angular displacements about the axis of said ball which is perpendicular to the plane of the drawing, this plane passing through the points of contact of the rollers 13 and 16 with the respective cam paths. These small angular displacements provide for equalisation of the loads exerted by the lateral rollers 16 upon the cams 14i, and wedging of the rollers is made impossible. It is to be noted that the adjusting and locking member 19 does not hinder the said small angular displacements of the sleeve 11 on the ball 9, due to the play that always exists between the teeth 21 which are moreover placed adjacent to the center of said ball, so as to be affected to a minimum by said small angular displacements.

The cams 14e and 14i on each side of the middle plane of the engine are rigidly connected together by a flange 25, and are rigidly connected to the cams of the other side by an annular member 26, the whole assembly driving the engine shaft 7, preferably through slidable coupling sleeves 27.

It will be understood that the object of the invention is not limited to its application to an engine as herebefore described, and that it can be applied to guided motion systems of the same kind which may be employed in other machines.

I claim:

1. A guided motion transmission system, comprising a lever, a pin on said lever, a sleeve rotatably mounted on said pin, said sleeve being formed with a central bearing surface excentric in one direction with respect to said pin and with two lateral bearing surfaces concentric with one another but excentric in the opposite direction with respect to said pin, a central roller rotatably mounted on said central bearing surface, lateral rollers rotatably mounted on said lateral bearing surfaces, a first cam adapted to cooperate with said central roller, a pair of second cams opposed to said first cam and adapted to cooperate with said lateral rollers, and means for rotating said sleeve on said pin and for locking said sleeve against rotation on said pin.

2. A guided motion transmission system as claimed in claim 1, wherein said rollers are mounted on said sleeve by roller bearings, and said sleeve is mounted on said pin so as to be able to execute angular displacements about an axis located in the middle plane of said central roller and perpendicular to the axis of said pin and to the plane passing through the points of contact of said rollers with said cams.

3. A guided motion transmission system as claimed in claim 1, comprising a ball mounted on said pin, a socket secured in said sleeve and rotatably mounted on said ball, and means for rotating said sleeve coaxially with said pin and for locking said sleeve against rotation coaxially with said pin.

4. A guided motion transmission system as claimed in claim 1 wherein said pin is hollow, and comprising a ball mounted on said pin, a socket secured in said sleeve and rotatably mounted on said ball, internal teeth in said sleeve, an adjusting and locking member axially movable in said sleeve, external teeth on said member engaging said internal teeth, other teeth formed on the inner end of said member, and corresponding teeth formed in said pin, adjacent to the center of said ball, and adapted to be engaged by said other teeth.

JEAN DEDIEU.

REFERENCES CITED

The following references are of record in the file of this patent:

UNITED STATES PATENTS

| Number | Name | Date |
| --- | --- | --- |
| 1,528,164 | Nordwick | Mar. 3, 1925 |
| 1,798,104 | Palmer | Mar. 24, 1931 |
| 2,086,835 | Adkisson et al. | July 13, 1937 |